C. I. JACKSON.
CORN PLANTER.
APPLICATION FILED AUG. 29, 1917.
1,269,451.
Patented June 11, 1918.
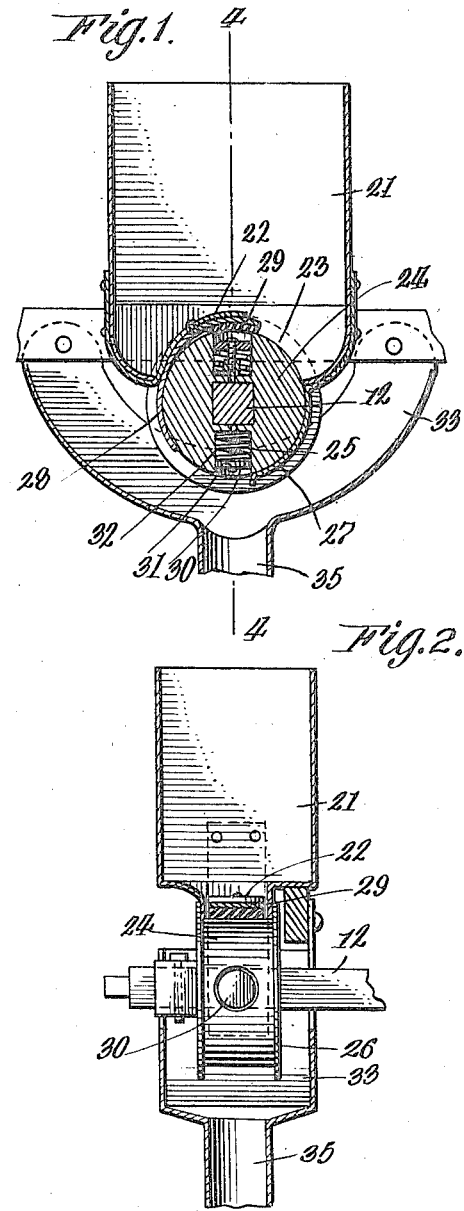
WITNESSES
Guy M. Spring
INVENTOR
Carrie I. Jackson
BY Richard Owen.
ATTORNEY

UNITED STATES PATENT OFFICE.

CARRIE I. JACKSON, OF PEPIN, WISCONSIN.

CORN-PLANTER.

1,269,451.  Specification of Letters Patent.  Patented June 11, 1918.

Application filed August 29, 1917. Serial No. 188,798.

*To all whom it may concern:*

Be it known that I, CARRIE I. JACKSON, a citizen of the United States, residing at Pepin, in the county of Pepin and State of Wisconsin, have invented certain new and useful Improvements in Corn-Planters, of which the following is a specification.

This invention has relation to corn planters, and has for an object to provide a corn planter for planting corn at uniformly spaced intervals without the use of a check wire.

Another object of the invention is to provide a corn planter constructed in a manner to permit any number of rows to be planted simultaneously as desired.

A still further object of the invention is to provide a corn planter embodying new and improved seed dropping means constructed in a manner to permit adjustment whereby one or a number of kernels may be deposited as desired.

In addition to the foregoing my invention comprehends improvements in the details of construction and arrangement of the parts to be hereinafter more fully described and particularly set forth in the appended claims.

In the accompanying drawings in which similar and corresponding parts are designated by the same characters of reference throughout the several views in which they appear:

Figure 1, is a detail view in section of one of the seed dropping mechanisms and Fig. 2, is a similar section taken on the line 4—4 of the preceding figure.

With reference to the drawings 12 indicates a main shaft, rectangular in cross section upon which one or a plurality of seed dropping mechanisms are supported. The shaft may be rotated by any suitable means. Each seed dropping mechanism includes a seed box 21 which may be mounted one at each end of the axle and centrally thereof. As shown in detail the lower ends of the seed boxes are reduced, and said reduced portions concaved upwardly and inwardly as indicated at 22 and said concaved portion formed with a recess 23 in communication with the interior of the box. The concaved portion 22 is curved concentric to the center of the axle 12 which is located therewithin and extended through the concaved portion and beneath the seed boxes to support drums 24 which are formed with a plurality of radial recesses 25. The drums are provided at their opposite ends with flanges 26 which received therebetween the reduced portions of the seed boxes. An apron 27 depends from the rear side of each seed box to embrace their respective drums for one quarter of their circumference. A second apron 28 is provided within the concaved portion 22 of each seed box to embrace slightly more than one-quarter of the circumference of the roller with the extreme upper end of said apron provided with a rubber brush 29 which engages the periphery of the roller. A disk 30 is slidably mounted in each recess 25 of each drum being held therewithin by means of a screw 31 which enters an aperture in the disk and is threadedly engaged in the drum at the lower portion of the recess whereby to adjust the disk within the recesses against the tension of springs 32 to increase or decrease the depth of the recesses at will. A trough shaped member 33 is mounted beneath each seed box and partly contains the lower portion of the drums, and each trough is formed with a depending spout 35.

As the machine is drawn along the ground, rotation of the drums 24 will be consequent and as the recesses thereof are successively brought in registration with the opening 23 of the seed boxes, the recesses will become filled with kernels and during further rotation of the drum the surplus kernels will be brushed off by means of the brushes 29 until the drums are rotated sufficiently to invert the recesses whereupon the kernels will be deposited in the trough 33 and directed by means of the spout into the furrows. The depth of the recess may be regulated by means of the adjusting screws 31 which engage the disk in the manner described above.

While I have illustrated and described my invention with some degree of particularity I realize that in practice various alterations thereover may be made, and I therefore desire to reserve the right and privilege of changing the form of the details of construction, or otherwise altering the arrangement of the correlative parts without departing from the spirit of the invention or the scope of the appended claims.

Having thus described my invention what I claim as new and desire to secure by Letters Patent is:—

1. In a corn planter, a rotatably mounted drum having a plurality of radial recesses and threaded openings in the bottom of each recess, a washer movable in each recess, a screw entering each washer for engagement in the threaded opening of the recess, and a coil spring within each recess bearing against the washer to urge the same outward, movement of the washer being limited by engagement thereof with the screw.

2. In a corn planter, a seed box having its lower end reduced and formed with an aperture, an arcuate member extending from one edge of the aperture upwardly into the box, a second arcuate member extending from the opposite edge of the aperture downwardly, a drum having a flange at each end mounted for rotation between the arcuate members and receiving between said flanges the reduced end of the box, an apron of flexible material secured to the arcuate member which extends into the box for engaging a portion of the periphery of the drum, a pad of resilient material secured to one end of the apron to engage the drum, and means within the drum to receive seed and to discharge the same therefrom.

In testimony whereof I affix my signature in presence of two witnesses.

Mrs. CARRIE I. JACKSON.

Witnesses:
  Lloyd A. Axtell,
  Angelina Peterson.

Copies of this patent may be obtained for five cents each, by addressing the "Commissioner of Patents, Washington, D. C."